July 20, 1965   H. COLLET   3,195,467
ROTARY PUMP UNITS AND THE LIKE
Filed Aug. 30, 1962   2 Sheets-Sheet 1
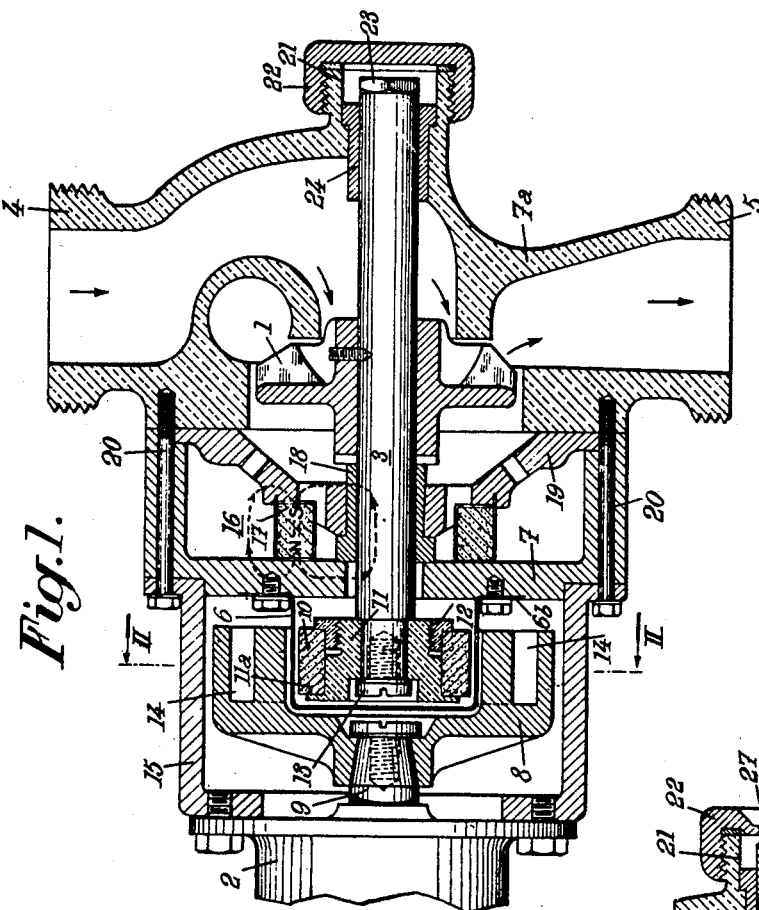
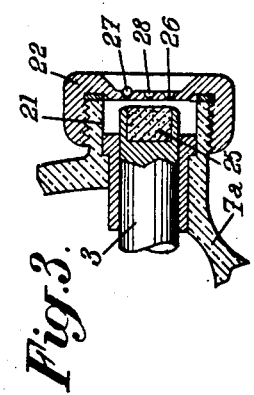
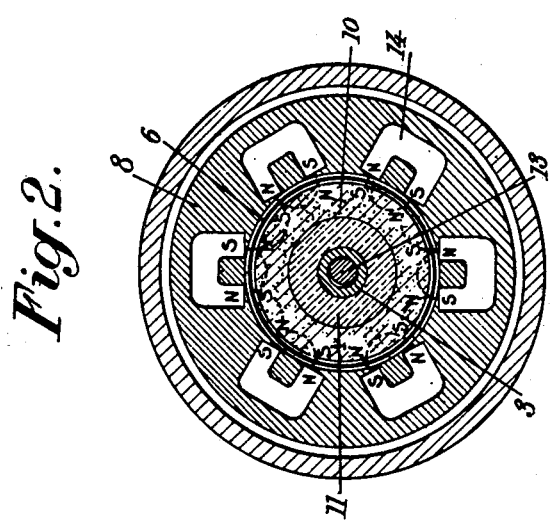
INVENTOR
HENRI COLLET, deceased
By: RAYMONDE Augustine Collet
Executor
BY:
Bailey, Stephens &
ATTORNEYS

# United States Patent Office 3,195,467
Patented July 20, 1965

3,195,467
ROTARY PUMP UNITS AND THE LIKE
Henri Collet, deceased, late of Oyonnax, France, by Raymonde Augustine Collet, executrix, 6 Rue Laplanche, Oyonnax, France
Filed Aug. 30, 1962, Ser. No. 220,582
Claims priority, application France, Sept. 8, 1961, 872,706; Apr. 9, 1962, 893,870
7 Claims. (Cl. 103—87)

This invention relates to a coupling device between two rotors separated from each other by a fluid-tight wall made of a non-magnetic material, the said rotors having for a determined relative angular position an even number of permanent magnet poles of opposed polarity facing each other.

Such a device may be conveniently used for separating in a motor driven pump unit the motor from the fluid forced by the rotating pump, particularly in an electrical centrifugal motor pump unit adapted to accelerate water circulation in a central heating system. It then permits of mounting the electric motor outside the system itself and thus of protecting it from humidity while facilitating its adjustment and maintenance.

The device according to the invention is mainly characterized by the fact that the permanent magnets of the motor side rotor are of a nature different from those of the pump side rotor, the ones, preferably those of the motor side rotor, having a high remanent induction, of the order of 10,000 gauss or more, such as magnetic steel alloy containing iron, cobalt, nickel, aluminium, copper and, possibly, titanium ("Ticonal" or the like), while the other oens are of a material having a high coercive field of 1,500 oersteds or more, such as a hard ferrite, particularly a ferrite having a base of barium oxide (for instance "Ferroxdur I").

There is conveniently provided between the driven rotor of the device and the pump rotor a magnetic trap with a permanent magnet preventing the magnetic impurities coming from the pump from reaching the said rotor.

When the rotors of the magnetic coupling device are co-axially disposed around each other and separated by a gap partition, as for instance established in the form of a cup or jacket surrounding without any contact the inner rotor and forming a fluid-tight wall between the casings in which rotate the shafts of both rotors, in line with each other, and when the permanent magnets of the inner rotor consist of a hard ferrite ring having on its periphery an even number of equally spaced poles, while the permanent magnets of the outer rotor are U-shaped individual magnets made of "Ticonal" and the poles of which are directed towards those of the ferrite ring, in accordance with a preferred embodiment of the invention, these U-shaped permanent magnets are given such dimensions and, with respect to the driven rotor, such positions, taking into account the gap, that, for a determined angular position of one of the rotors with respect to the other one, the centres of the two poles of each U-shaped magnet be situated at the ends of the diameter of a semi-circue passing through the centres of the two corresponding poles situated at the periphery of the ferrite ring.

In accordance with a convenient embodiment, there is provided in the casing of the pump an opening through which access may be had to the shaft of the driven rotor at its end opposed to the end situated within the fluid-tight cup or jacket.

Other features and advantages of the invention will appear from the following description and from the annexed drawings which illustrate by way of example a number of embodiments of the invention.

FIG. 1 shows in axial section a motor pump according to the invention adapted to accelerate water circulation in a central heating system.

FIG. 2 is a sectional view taken along line II—II of FIG. 1.

FIG. 3 is a similar sectional view illustrating a modification.

Figure 4:
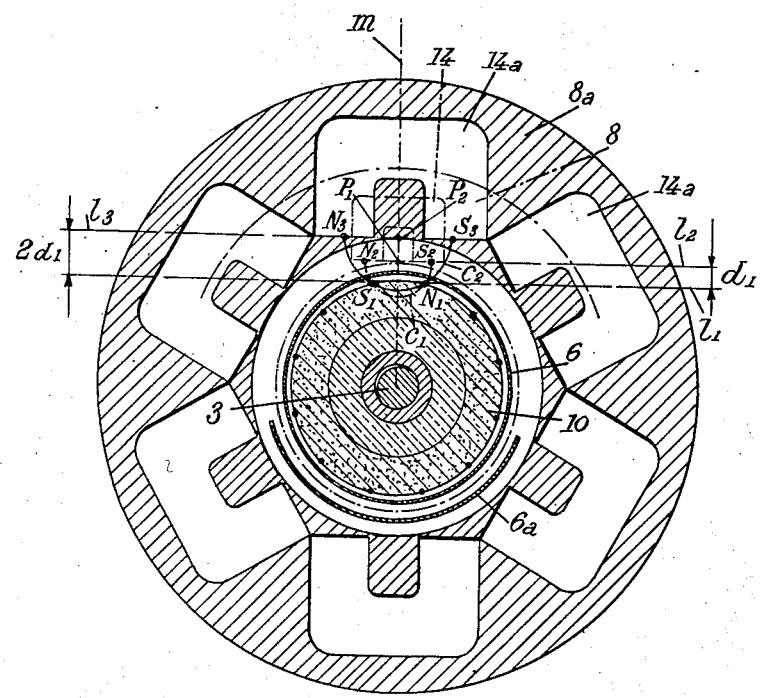
FIG. 4 is a fragmental sectional view showing a motor pump established in accordance with a further modification.

In these drawings, reference numeral 1 designates a centrifugal pump adapted to accelerate water circulation in a central heating system, this pump being driven by an electric motor 2, disposed outside a fluid-tight casing 7, 7a which completely surrounds the pump 1 and its shaft 3, and which comprises connections 4 and 5, respectively for the inlet and the outlet of water.

On the free end of the shaft 3 of pump 1 is disposed a drum which forms at least one permanent magnet 10 the opposed poles of which are of cyclically alternate polarity along the periphery of the drum.

The drum which protrudes outwards from the pump casing 7, 7a is surrounded by a thin cup or jacket 6 made of a non-magnetic material, the said cup being connected in a fluid-tight manner with the hermetically closed casing 7, 7a so as to complete this casing into a fluid-tight box enclosing pump 1 and its shaft 3.

The cap 6 is in turn surrounded by a bell-shaped member 8 keyed onto the end of the shaft 9 of the motor 2, which shaft is mounted outside the fluid-tight casing 7, 7a of the pump, in line with the shaft 3 of the latter, the said bell-shaped member carrying U-shaped permanent magnets the poles of which are directed towards those of the aforesaid drum.

In accordance with an important feature of the invention, the permanent magnets 14 of the bell-shaped member 8 are of a nature different from the permanent magnet 10 of the drum in question. There is preferably used for these magnets 14, which must have a very high remanent induction, for instance of 10,000 to 11,000 gauss or more, a magnetic steel alloy having a base of iron, cobalt, nickel, aluminum, copper and possibly titanium, such as for instance the steel known under the commercial name "Ticonal." For the permanent magnet 10, which must have primarily a high coercive field, for instance of 1,500 oersteds or more and an induction withstanding the action of heat, there is conveniently used a hard ferrite, particularly a ferrite having a base of barium oxide such as that known under the commercial name "Ferroxdur I."

This selection of the permanent magnets affords considerable advantages.

Assuming that, in contradiction with the invention, there were used for the permanent magnets of both rotors of the coupling device a steel of the kind of Ticonal, the coercive field of which is of the order of 800 oersteds only, and that for any reason, as for instance passage of an impurity, the pump 1 becomes jammed, in such a manner that the poles of one rotor pass in front of the poles of same polarity of the other rotor, the relatively weak coercive field of the permanent magnets could not resist demagnetization by the quite strong remanent induction of 10,000 gauss of the facing magnets, so that the magnets would demagnetize each other and that the coupling would become definitely ineffective.

Assuming now that in contradiction with the invention the permanent magnets of both rotors be of hard ferrite, demagnetization would no more have to be feared owing to the high coercive field of the ferrite, but the torque which could be transmitted would be quite reduced due to the small remanent induction of hard ferrites (about 2,200 gauss) and further in order to obtain a coupling between both rotors the gap would have to be quite small. A small gap is however a considerable drawback for a coupling device of the kind in question, wherein the cup or jacket 6 must separate the rotors from each other in the gap without coming into contact with them, and it would on the contrary be of advantage to have a substantial space between the rotors and the said cup or jacket for avoiding that impurities may jam one of them against the static cup, for permitting larger manufacturing tolerances and therefore for lowering the manufacturing cost of the whole unit.

The magnetic coupling device according to the invention avoids the above-mentioned inconveniences. It is possible to provide a large gap owing to the fact that the high remanent induction of the permanent magnets 14 permits the lines of force of these magnets to pass through such a gap to reach the poles of the magnet 10. The high coercive field of this magnet 10, of 1,600 to 1,700 oersteds, prevents any demagnetization and its remanent induction of only 2,200 gauss is insufficient for causing demagnetization of magnets 14. The use of a hard ferrite for the magnet 10 within the fluid-tight casing 7, 7a of a hot water heating system is besides of advantage in consideration of the resistance of such a magnet to corrosion and to demagnetization under the effect of heat, the temperature being relatively high since the frictional power losses in the bearing 18 add their effect to the action of hot water.

In accordance with the invention, in order to obtain for the coupling device the highest possible magnetic connecting force between the permanent magnets of the above-specified type of the driving rotor 8 on the one hand, and of the driven rotor 10 on the other hand, the magnets 14 are given such dimensions and, with respect to the rotor 10, such positions that, taking into account the gap, for a determined angular position of rotor 8 with respect to rotor 10, the centres $N_2$ and $S_2$ (FIG. 3) of the poles of each U-shaped permanent magnet 14 be situated at the ends of the diameter of a semi-circle $c_1$ passing through the axes of the two corresponding poles $S_1$, $N_1$ of the annular permanent magnet 10.

Assuming that a driven rotor 10, having the diameter shown in the drawing, has twelve equally spaced peripheral poles $S_1$, $N_1$ of alternate polarities along its periphery, and that it is desired to provide a gap $d_1$ between the said rotor 10 and the driving rotor 8, the dimensions and the positions of the Ticonal magnets 14 in the driving rotor 8 may be determined as follows:

A straight line $l_1$ is drawn tangentially to the periphery of the ring 10 and at equal distance from the adjacent points $S_1$ and $N_1$. A second straight line $l_2$ is drawn parallel to the first line $l_1$ and at a distance $d_1$ therefrom.

The line $m$ perpendicular to $S_1$, $N_1$ and equidistant from these points intersects $l_2$ at a point $P_1$ which is the centre of the circle $c_1$ passing through the said points $S_1$ and $N_1$.

This circle $c_1$ intersects line $l_2$ at the points $N_2$ and $S_2$ where the poles of the Ticonal magnet 14 should be disposed.

Since with a U-shaped Ticonal magnet the mean magnetic line of force goes from the centre $N_2$ of one pole to the centre $S_2$ of the other pole in the form of a semi-circle, one may be sure that by processing as above explained, in accordance with the invention, the lines of force of the magnet 14 will co-act under the best conditions with the corresponding poles $S_1$ and $N_1$ of the permanent magnet 10.

Assuming now that it is desired to establish a coupling device having the same driven rotor 10 as in the preceding example and capable of transmitting the same torque, but with a gap of double width, i.e. $2d_1$, one may proceed as follows:

A line $l_3$ is drawn parallel to $l_1$ at a distance $2d_1$ therefrom, the said line intersecting line $m$ at a point $P_2$ which is the centre of a circle $c_2$ passing through points $S_1$ and $N_1$.

The points of intersection $N_3$ and $S_3$ of this circle $c_2$ and of line $l_3$ determine the positions of the centres of the poles of the Ticonal magnet 14a in the driving rotor 8a.

It will be appreciated that for a given diameter of the driven rotor 10 the widest possible gap is obtained with a driving rotor 8a in which each U-shaped magnet 14a has its outer sides in engagement with the sides of the two adjacent magnets, as shown in full lines in the drawing.

This is the preferred embodiment of the coupling device according to the invention, since the large gap permits of easily disposing the cup or jacket 6 without this requiring a highly accurate adjustment, and also of avoiding that the impurities entrained by the liquid forced by the pump may jam the rotor 10 against a jacket 6 too close to the said rotor.

When the rotor 8a is selected, there is of course used another separating cup or jacket 6a more spaced from the rotor 10 than the above-described jacket 6 (see the lower part of FIG. 3).

Further, contact of poles of opposed polarity affords the advantage of re-inforcing the remanence, i.e. the useful remanent flux of magnets 14a.

If it is desired to obtain a wider gap, a driven rotor 10 of increased diameter should be used.

In the embodiment illustrated in the drawings the ring 10 which forms the permanent magnet made of a hard ferrite is engaged on a core 11 of non-magnetic material and it is urged against a shoulder 11a of the said core by a nut 12, also of non-magnetic material, screwed on a screw-threaded portion of the core. This core 11 is secured on to the shaft 3 by a set screw 13.

The bell-shaped member 8 is made of a non-magnetic material such as a metal or a light alloy or a plastic. It is formed with U-shaped recesses the ends of which open on the inner periphery of the member, each one containing a magnet 14 retained at a fixed position in its recess as for instance by a screw or an adhesive, or by being embedded in the material of the bell 8 during the moulding of the latter.

In the case illustrated in FIG. 2, wherein the bell-shaped member 8 carries six magnets 14, and assuming that the drawing is established to the scale 1/3, the magnetic coupling device may transmit from shaft 9 to shaft 3 with an efficiency of 100% (since there is no slip and no heating due to eddy currents) a torque of about 3 kg. cm.

The same coupling device with only four magnets permits the transmission of a torque of 2 kg. cm. With three magnets the torque transmitted would be 1.5 kg. cm. and with two magnets 1 kg. cm.

In the above examples the gap between ring 10 and bell 8 was each time of about 3 mm., which is sufficient for disposing the cup or jacket 6 against which of course neither drum 10 11 12 nor bell 8 should rub.

The cup or jacket 6 may be obtained by stamping from a stainless non-magnetic sheet-steel having a thickness of 0.6 to 0.8 mm. It may also be made of a plastic material or in any other rigid non-magnetic material.

The cup or jacket 6 is provided on its open end with an annular flange 6b through which it is secured, as by screws, against the portions 7 of the liquid-tight casing, a flat seal being disposed between both parts.

The driving motor 2, which is removably secured by means of a stirrup 15 against the pump casing 7, is of a type which may be commonly found in trade. It may be easily replaced when required. This motor may have more than a single running speed in order that the water flow may be increased in accordance with the season of the year.

The driving motor may be automatically controlled so as to operate at a high speed during the starting period of the heating system and thereafter at a reduced speed when this system has reached its normal operating temperature (thermostatic control).

There is conveniently provided within the pump casing 7, 7a between the pump 1 and its volute on the one end, and the inner space of the cup or jacket 6 on which the drums 10, 11, 12 rotates on the other hand, a settling chamber 16 with a magnetic trap disposed therein.

The said magnetic trap may be formed of a ring 17 retained around the bearing 18 of shaft 3, between the removable cup-shaped walls of chamber 16, the first one of these walls being constituted by a cover 19 which closes the space containing the pump rotor 1 and which supports the bearing 18 of the pump shaft, while the other one is the portion 7 of the outer wall of the fluid-tight casing which carries the cup or jacket 6.

These walls 19, 7 and the stirrup 15 which are axially superimposed around the pump shaft 3 are conveniently secured by common gudgeons 20 to the portion 7a of the pump casing, which permits of readily dismounting all of the movable parts of the pump by merely removing gudgeons 20 without it being necessary to remove the portion 7a from the heating system. It is even possible to re-establish water circulation in the said system after having secured a temporary cover (not illustrated) against the portion 7a of the casing, the said cover taking the place of the portion 7 of the said casing and being secured by screws screwed into the tapped holes normally adapted to receive gudgeons 20. Water circulation then takes place by thermosyphon effect.

The trap ring 17 is formed of a permanent magnet made of the same material as ring 10 and the opposed poles of which are situated on the lateral sides or ends which bear respectively against the walls 7 and 19 of non-magnetic material. In this manner the magnetic flux of ring 17 passes through chamber 16 and through shaft 3, the ferro-magnetic impurities (iron particles, rust, etc.) being thus retained within the settling chamber 16 and prevented from penetrating the cup or jacket 6.

Concerning the end of the pump shaft 3 opposed to the drums 10, 11, 12, it is conveniently made accessible through an inspection opening 21 provided in the portion 7a of the fluid-tight casing, the said opening being normally closed by a removable plug 22. This end of shaft 3 is preferably so formed that it may be caught and forced into rotation by means of a tool such as a spanner of a screw-driver.

For this purpose this end 23 of shaft 3 may be given the shape of a hexagonal nut and it may protrude beyond a bearing 24 mounted in the said opening 21 (FIG. 1).

It is thus possible, without having to proceed to any dismounting operation apart from unscrewing plug 22, to verify that the pump shaft 3 is actually driven by the driving shaft 9 and, if such is not the case, to force it to rotate, this being often sufficient for starting a scaled pump or for dislodging an impurity which could have become caught in the apparatus, as for instance between the pump rotor 1 and its liquid-tight casing.

It may besides be of advantage to provide the end 23 of shaft 3 with a permanent magnet 25, as for instance made of the same material as rings 10 and 17, and the opposed poles of which are disposed on each side of a diameter of the said shaft (FIG. 4). The plug 22, made of a non-magnetic material, has a circular groove 26 concentric to shaft 3. If a ball 27 of magnetic material is disposed in this groove 26, it runs along the latter in the direction of rotation of shaft 3, whereby this rotation may be controlled without removing plug 22. A central recess 28 may be provided in the said plug for receiving the ball 27 when left at rest.

What is claimed is:

1. A motor driven rotating pump which comprises, in combination, a pump casing having an inlet and an outlet, a pump rotor rotatable in said casing about an axis to force a fluid from said inlet through said outlet, a pump shaft disposed along said axis to carry said pump rotor, said shaft having an end portion protruding outwardly from said pump casing, bearing means carried by said casing to support said pump shaft rotatably, an inner magnetic coupling rotor mounted on the protruding end of said pump shaft coaxially therewith, a cylindrical permanent magnet carried by said inner rotor coaxially therewith, said magnet having an even number of poles of alternate polarities on the periphery thereof, said magnet being made of a material having a high coercive field.

a cup-shaped non-magnetic fluidtight cylindrical partition coaxially surrounding said inner rotor and having its open end sealingly secured to said pump casing, an outer cup-shaped magnetic coupling motor disposed around said inner coupling rotor coaxially therewith and externally with respect to said partition, a plurality of U-shaped permanent magnets rigidly carried by said outer rotor, said U-shaped magnets being circularly disposed about said axis with their poles around the poles of said first mentioned magnet so as to cooperate therewith while remaining spaced therefrom, said U-shaped permanent magnets being made of a material having a high remanent induction.

2. A pump according to claim 1 wherein said U-shaped permanent magnets have a remanent induction of at least 10,000 gauss.

3. A pump according to claim 1 wherein said U-shaped permanent magnets are made of a magnetic steel alloy containing iron, cobalt, aluminum and copper.

4. A pump according to claim 1 wherein said cylinder permanent magnet means has a coercive field of at least 1,500 oersteds.

5. A pump according to claim 1 wherein said cylindrical permanent magnet is made of a hard ferrite.

6. A pump according to claim 1 further comprising two spaced transverse partitions disposed between said pump rotor and said inner coupling rotor, and through which said pump shaft extends, said partitions determining an intermediate settling chamber; and an annular permanent magnet disposed around said pump shaft within said settling chamber, said annular permanent magnet having two circular poles at its ends to form a magnetic trap within said chamber.

7. In a pump according to claim 1, said U-shaped magnets being U-shaped in section by planes perpendicular to the axis and distributed about said axis, and being so dimensioned and positioned on said outer rotor, that, for a certain relative position of said two rotors with respcet to each other, the centers of the poles of every U-shaped magnet of said outer rotor are located at the respective ends of the diameter of a half circle passing through the centers of two corresponding opposed poles of said inner rotor permanent magnet.

References Cited by the Examiner

UNITED STATES PATENTS

| | | | |
|---|---|---|---|
| 1,673,837 | 6/28 | Lotz | 210—222 |
| 1,872,759 | 8/32 | Laughlin et al. | 210—222 |
| 2,508,666 | 5/50 | Frantz | 210—222 |
| 2,756,680 | 7/56 | Rutschi | 103—87 |
| 2,766,695 | 10/56 | Gailloud | 103—87 |
| 2,970,548 | 2/61 | Berner | 103—87 |
| 3,001,479 | 9/61 | Swenson et al. | 103—87 |
| 3,050,646 | 8/62 | Eddy et al. | 310—104 |
| 3,051,858 | 8/62 | McCown et al. | 310—104 |

LAURENCE V. EFNER, *Primary Examiner.*

ROBERT M. WALKER, *Examiner.*